(12) United States Patent
Horn

(10) Patent No.: US 11,915,728 B2
(45) Date of Patent: Feb. 27, 2024

(54) RAIL-BASED MEDIA TRANSPORT ROBOT FOR DISK CARTRIDGE DATA STORAGE LIBRARY

(71) Applicant: Western Digital Technologies, Inc., San Jose, CA (US)

(72) Inventor: Robert L. Horn, Yorba Linda, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/097,473

(22) Filed: Jan. 16, 2023

(65) Prior Publication Data

US 2023/0238028 A1 Jul. 27, 2023

Related U.S. Application Data

(60) Provisional application No. 63/302,063, filed on Jan. 22, 2022.

(51) Int. Cl.
*G11B 15/68* (2006.01)
*G11B 33/04* (2006.01)
*G11B 33/02* (2006.01)

(52) U.S. Cl.
CPC ...... *G11B 33/0483* (2013.01); *G11B 15/6825* (2013.01); *G11B 15/6835* (2013.01); *G11B 33/027* (2013.01)

(58) Field of Classification Search
None
See application file for complete search history.

(56) References Cited

U.S. PATENT DOCUMENTS

| | | | |
|---|---|---|---|
| 3,359,549 A | 12/1967 | Farrand et al. | |
| 4,937,690 A * | 6/1990 | Yamashita | G11B 15/6825 |
| 5,128,912 A * | 7/1992 | Hug | G11B 17/225 |
| | | | 360/99.06 |
| 5,206,845 A * | 4/1993 | Baxter | G11B 17/225 |
| 5,548,521 A | 8/1996 | Krayer et al. | |
| 5,893,699 A | 4/1999 | Dadiomov | |

(Continued)

OTHER PUBLICATIONS

Sony Electronics Inc., Meet the family, 2 pages, downloaded from https://pro.sony/ue_US/products/optical-disc, as early as Aug. 5, 2021.

(Continued)

*Primary Examiner* — William J Klimowicz
(74) *Attorney, Agent, or Firm* — John D. Henkhaus

(57) ABSTRACT

A data storage disk cartridge library system includes a rack having an array of bays, at least some housing disk media cartridges and/or media drives, and a pair of horizontal and vertical guide rails bordering each bay. A media transport robot includes fixed-position drive wheels at each corner for driving the robot along the guide rails, and pivoting guide wheels corresponding to each drive wheel for guiding the drive wheel horizontally along a horizontal guide rail and vertically along a vertical guide rail. With each guide wheel coupled with a horizontal guide rail the robot can travel horizontally on the rack, and with each guide wheel coupled with a vertical guide rail the robot can travel vertically on the rack. Electrical power can be supplied to the robot via the guide rails, and gear portions of the wheels mechanically interface with a mechanical portion of the guide rails.

19 Claims, 8 Drawing Sheets

(56) References Cited

U.S. PATENT DOCUMENTS

| | | | |
|---|---|---|---|
| 6,222,699 B1* | 4/2001 | Luffel | G11B 17/225 360/92.1 |
| 6,301,204 B1 | 10/2001 | Yamada et al. | |
| 6,639,879 B2* | 10/2003 | Plutt | G11B 17/225 |
| 6,671,575 B2 | 12/2003 | Baik | |
| 6,690,994 B1* | 2/2004 | Smith | G11B 15/6835 700/214 |
| 7,184,238 B1* | 2/2007 | Ostwald | G11B 17/22 |
| 7,328,442 B2* | 2/2008 | Porter | G11B 15/6835 360/92.1 |
| 7,383,560 B2 | 6/2008 | Edwards | |
| 8,305,706 B2* | 11/2012 | Kerns | G11B 33/128 360/92.1 |
| 8,345,375 B2* | 1/2013 | Ichimura | G11B 17/225 369/30.43 |
| 8,958,173 B1 | 2/2015 | Hirano et al. | |
| 9,063,542 B2 | 6/2015 | Greco et al. | |
| 9,601,149 B1 | 3/2017 | Todd et al. | |
| 9,607,662 B1 | 3/2017 | Adrian | |
| 9,715,894 B2 | 7/2017 | Ostwald et al. | |
| 10,600,441 B1 | 3/2020 | Altknecht et al. | |
| 10,770,108 B2 | 9/2020 | Goto et al. | |
| 11,443,775 B1 | 9/2022 | Herdendorf et al. | |
| 2001/0008473 A1* | 7/2001 | Schmidtke | G11B 17/225 360/92.1 |
| 2001/0043553 A1* | 11/2001 | Haupt | G11B 17/223 |
| 2002/0027742 A1* | 3/2002 | Ostwald | G11B 15/6835 360/92.1 |
| 2002/0055804 A1 | 5/2002 | Betawar et al. | |
| 2002/0159182 A1 | 10/2002 | Albrecht et al. | |
| 2003/0002202 A1* | 1/2003 | Smith | G11B 15/6835 360/92.1 |
| 2003/0112717 A1* | 6/2003 | Plutt | G11B 15/6835 360/92.1 |
| 2003/0113193 A1* | 6/2003 | Ostwald | G11B 15/6835 360/92.1 |
| 2003/0114958 A1* | 6/2003 | Plutt | G11B 17/225 |
| 2003/0123300 A1* | 7/2003 | Campbell | G11B 15/6835 |
| 2003/0125833 A1* | 7/2003 | Campbell | G11B 15/6835 |
| 2003/0125834 A1* | 7/2003 | Campbell | G11B 17/225 700/214 |
| 2003/0125838 A1* | 7/2003 | Campbell | G11B 15/6835 |
| 2003/0161070 A1 | 8/2003 | Bonin | |
| 2004/0008445 A1* | 1/2004 | Vanderheyden | G11B 15/6835 360/92.1 |
| 2004/0049313 A1 | 3/2004 | Deckers | |
| 2004/0056568 A1* | 3/2004 | Carlson | G11B 15/682 312/223.1 |
| 2004/0130819 A1* | 7/2004 | Hoelsaeter | G11B 15/6885 360/92.1 |
| 2004/0258507 A1* | 12/2004 | Coffin | G11B 15/6835 |
| 2006/0146658 A1 | 7/2006 | Russ | |
| 2007/0201164 A1 | 8/2007 | Bauck et al. | |
| 2009/0147398 A1* | 6/2009 | Nave | G11B 15/689 360/92.1 |
| 2009/0297328 A1 | 12/2009 | Slocum, III | |
| 2010/0241271 A1 | 9/2010 | Shimizu et al. | |
| 2010/0287576 A1 | 11/2010 | Terzis et al. | |
| 2011/0064546 A1 | 3/2011 | Merrow | |
| 2011/0236163 A1 | 9/2011 | Smith et al. | |
| 2013/0322223 A1* | 12/2013 | Minemura | G11B 15/6835 369/75.11 |
| 2014/0007143 A1* | 1/2014 | Higaki | G11B 17/225 720/613 |
| 2014/0271064 A1 | 9/2014 | Merrow et al. | |
| 2017/0084304 A1 | 3/2017 | Fiebrich-Kandler | |
| 2017/0181306 A1 | 6/2017 | Shaw et al. | |
| 2018/0211691 A1 | 7/2018 | Altknecht et al. | |
| 2020/0119314 A1 | 4/2020 | Pun et al. | |
| 2023/0048789 A1* | 2/2023 | Hirano | G11B 17/044 |
| 2023/0238036 A1* | 7/2023 | Horn | G11B 33/0483 360/97.11 |

OTHER PUBLICATIONS

Sony Electronics Inc., PetaSite Scalable Solutions, 5 pages, downloaded from https://pro.sony/ue_US/products/optical-disc/petasite-solutions, as early as Aug. 5, 2021.

Korean Intellectual Property Office (ISA/KR), PCT International Search Report and Written Opinion for International application No. PCT/US2022/027549, dated Oct. 21, 2022, 10 pages.

Hirano, Toshiki, Archival Data Storage Library, U.S. Appl. No. 17/402,370, filed Aug. 13, 2021.

* cited by examiner ated with reference to specific values, if any disclosed, then corresponding absolute values and reasonable approximations thereof may be envisioned. Furthermore, the terms "first", "second", "third", "fourth", and the like used herein do not denote any order of importance, but rather are used to distinguish one element from another, unless otherwise noted herein.

RAIL-BASED MEDIA TRANSPORT ROBOT FOR DISK CARTRIDGE DATA STORAGE LIBRARY

CROSS-REFERENCE TO RELATED APPLICATIONS

This application claims the benefit of priority to commonly-owned U.S. Provisional Patent Application No. 63/302,063 filed on Jan. 22, 2022, the entire content of which is incorporated by reference for all purposes as if fully set forth herein.

FIELD OF EMBODIMENTS

Embodiments of the invention relate generally to mass data storage, and particularly to a media transport robot for a disk cartridge data storage library.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

There is an increasing need for archival data storage. Magnetic tape is a traditional solution for data back-up, but is notably slow in accessing the stored data. In terms of magnetic media cost, magnetic disks in HDDs have the lowest demonstrated cost per terabyte (e.g., $/Tb). Furthermore, magnetic disks are known to have a relatively lengthy useful life, especially when maintained in a controlled environment, whereby the magnetic bits on the media will remain stable for a relatively long time. Tape libraries are known to have a high TCO (total cost of ownership), including costly stringent environmental conditions such as regarding humidity, temperature, and the like, which may even drive the need for a separate datacenter. Still further, tape datacenter power requirements may be considered excessive.

With respect to reducing the overall cost per byte ($/Tb) of magnetic disk-based storage systems, increasing the number of disks per system is one way in which to further the $/Tb cost reduction goal. Hence, a vast magnetic disk "library" containing a significantly large number of magnetic recording disks is considered an ultimate low-cost solution to the challenges associated with archival data storage both now and into the future, and would demonstrate a faster "time to first byte" than tape (e.g., no tape winding needed) and a faster data rate than with optical disks.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1A:
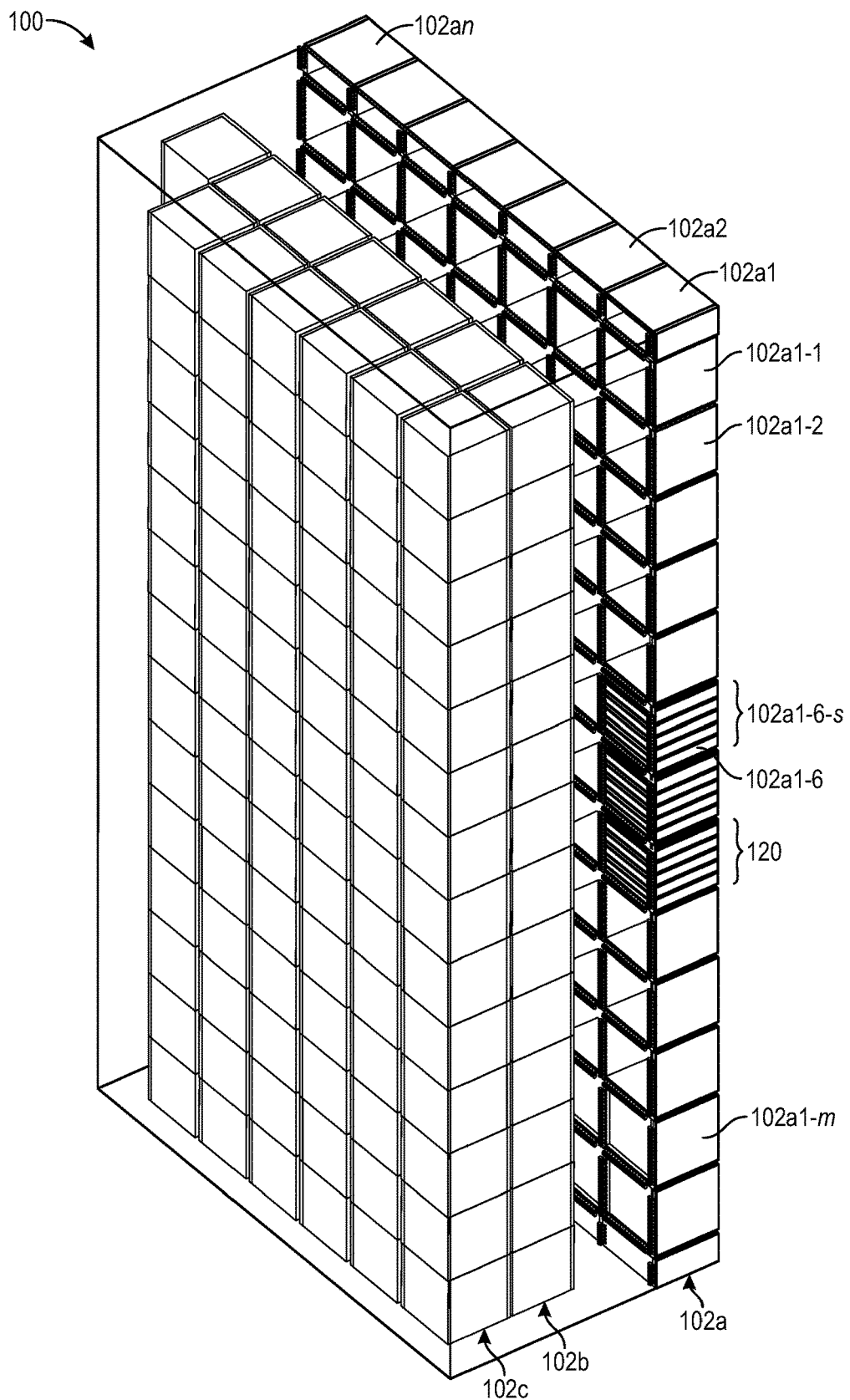
FIG. 1A is a perspective view illustrating a disk cartridge library rack system, according to an embodiment.

Generally, approaches to a mass data storage library utilizing disk cartridges and a media transport robot for handling such disk cartridges are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that a vast magnetic disk "library" containing a significantly large number of magnetic recording disks is considered an ultimate low-cost solution to the challenges associated with archival data storage. One possible approach to such a data storage library utilizing magnetic recording disk media involves use of disk cartridges housing multiple disk media for use in storing and accessing data stored thereon by a read-write device. A disk cartridge library system is considered scalable, for example, in that the number of media, drives, and robots, i.e., the constituent components, are all readily scalable. Further, the capacity is expandable, such as by adding additional columns of cartridge storage bays to the system. The library is serviceable, for example, in that cartridges that may become dirty can be readily removed and new cartridges are easily added to the system. Also, the library can be readily shipped, built, and upgraded in a modular manner as constituent components and modules can be packaged, transported, maintained separately and independently. The library is reliable in that there is no single point of failure, as the blast radius due to a failure is effectively limited to a single medium, drive or robot, which are each readily replaceable, and therefore a failure does not extend to or encompass additional components. However, such a disk cartridge library may present challenges with respect to the automated handling of disk cartridges within the disk cartridge library system.

DATA STORAGE LIBRARY RACK SYSTEM

FIG. 1A is a perspective view illustrating a disk cartridge library rack system, according to an embodiment. Example disk cartridge library rack system 100 ("rack system 100") may comprise one or more racks, shown here as rack 102a, rack 102b, rack 102c. One or more of the racks 102a-102c comprises an array (e.g., a row of columns 102a1, 102a2 through 102an, where n represents an arbitrary number of columns that may vary from implementation to implementation) of bays, such as disk cartridge bays or read-write device bays (e.g., a column 102a1 of bays 102a1-1, 102a1-2 through 102a1-m, where m represents an arbitrary number of disk cartridge/read-write device bays that may vary from implementation to implementation) or otherwise, each comprising one or more slots (e.g., a bay 102a1-6 comprising slots 102a1-6-s, where s represents an arbitrary number of slots that may vary from implementation to implementation) each configured to house at least one disk media cartridge 120 housing multiple recording disk media such as magnetic-recording disk media or "hard disks", or to house a read-write device. According to an embodiment, any one or more of the cartridge bays (e.g., 102a1-1 through 102a1-m) constituent to any of the columns 102a1 through 102an may house a read-write device (or "media drive") configured for writing to and reading from disk media (e.g., a device comprising a head slider housing a read-write transducer, an actuator, a spindle motor, etc.), rather than housing a disk cartridge 120. One non-limiting example approach to such a media drive is described and illustrated in U.S. patent application Ser. No. 18/095,483, entitled "DISK CARTRIDGE DATA STORAGE LIBRARY", the entire content of which is incorporated by reference in its entirety for all purposes as if fully set forth herein. With the configuration of rack 102a (e.g., the number of columns, bays, slots, etc.) being variable from implementation to implementation, rack 102a may be considered customer-configurable.

Rack system 100 may further comprise a second rack 102b adjacent to while separated from rack 102a, and between which a media transport robot 200 (FIGS. 2A-2B) transverses and otherwise operates, which is described in more detail elsewhere herein. As with the configuration of rack 102a, the configuration of rack 102b may too from implementation to implementation and thus be customer-configurable. According to an embodiment, rack 102a is configured and employed to house disk cartridges 120 for a disk cartridge type data storage library and rack 102b is configured and employed to house media ("read-write") drives for such data storage library. As such, with the bays of rack 102a aligned with the bays of rack 102b, media transport robot 200 is configured to retrieve disk cartridges 120 (e.g., via one side of media transport robot 200) from any of the cartridge bays 102a1-1 through 102a1-m of rack 102a and load those disk cartridges 120 (e.g., via the other side of media transport robot 200) into any media device housed in any media drive bay (e.g., similar to cartridge bays 102a1-1 through 102a1-m but housing a media drive instead of a disk cartridge 120) constituent to rack 102b. According to another embodiment, rack 102a is configured and employed to house disk cartridges 120 and media drives and rack 102b is configured and employed to house only disk cartridges 120. According to another embodiment, rack 102a is configured and employed to house disk cartridges 120 and media drives and rack 102b is configured and employed to house disk cartridges 120 and media drives. The foregoing embodiments characterize the flexibility of configuration and use of a rack system 100 for a corresponding disk cartridge data storage library.

According to an embodiment, a high-density rack system 100 may further comprise a third rack 102c adjacent to rack 102b, where rack 102c is configured with at least one fewer column than rack 102b. Here, the columns of each rack 102b, 102c are movable and can be shifted individually or in groups toward an empty column position. As such, columns depicted as from rack 102c may be slid into an open column depicted as from rack 102b, thereby enabling access to all of the columns of bays of both rack 102b and rack 102c. Effectively, the foregoing configuration provides for a dynamically-configured multiple-depth rack 102b/102c.

Figure 1B:
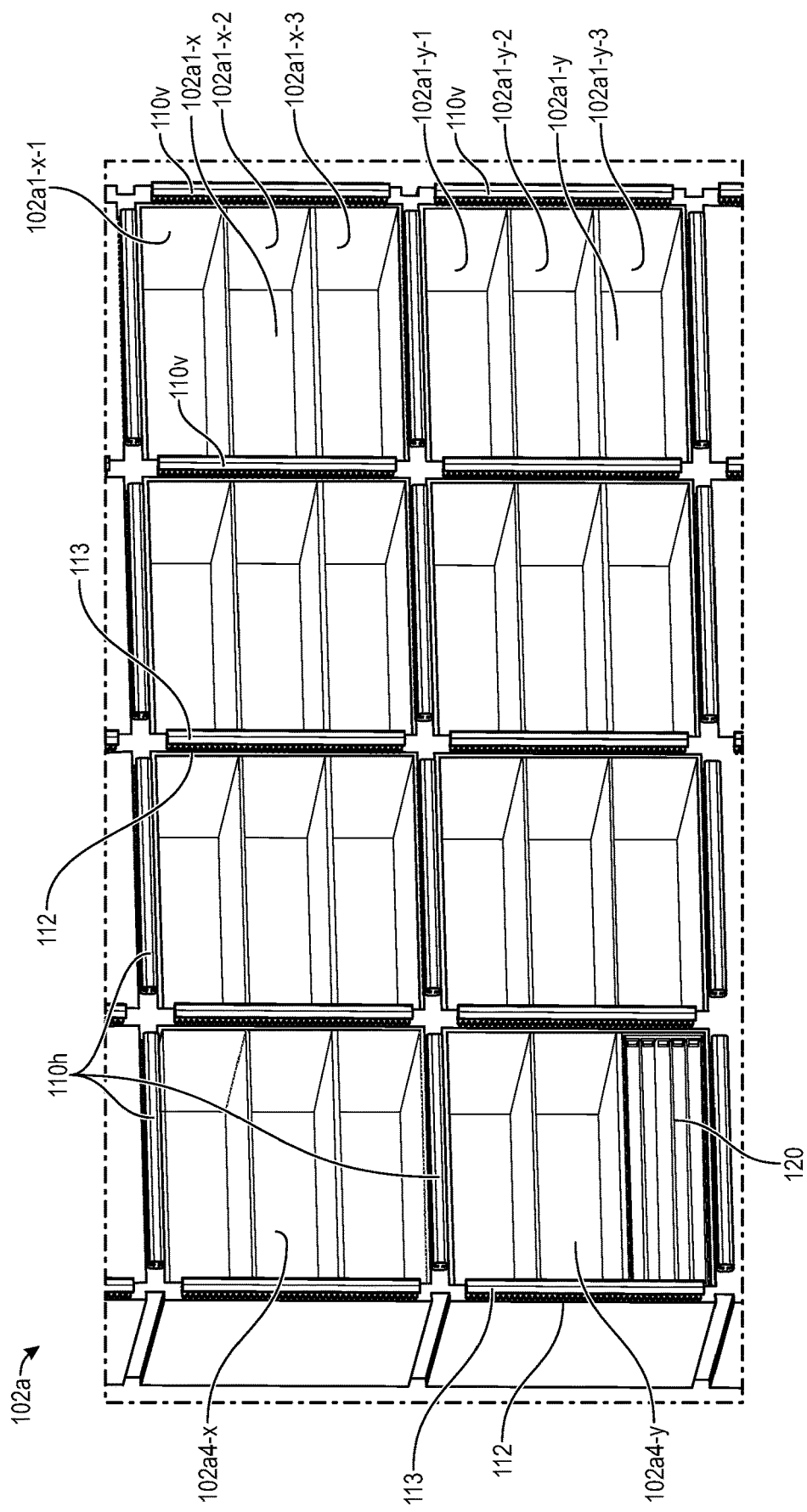
FIG. 1B is a front perspective view illustrating a portion of the disk cartridge library rack of FIG. 1A, according to an embodiment.

FIG. 1B is a front perspective view illustrating a portion of the disk cartridge library rack of FIG. 1A, according to an embodiment. While the flexibility of the combination of racks 102a, 102b is described in reference to FIG. 1A, according to an embodiment one of the racks is configured with a pair of horizontal guide rails 110h and a pair of vertical guide rails 110v (only some of which are labeled in FIG. 1B to maintain clarity) bordering each bay, e.g., cartridge bays 102a1-1, 102a1-2 through 102a1-m (FIG. 1A). For explanation purposes, rack 102a is described as comprising the horizontal and vertical guide rails 110h, 110v. An arbitrary disk cartridge bay 102a1-x is depicted arbitrarily with three slots 102a1-x-1, 102a1-x-2, 102a1-x-3, each of which is configured to house a disk cartridge such as disk cartridge 120, through disk cartridge bay 102a4-x.

Similarly, an arbitrary disk cartridge bay 102a1-y is depicted arbitrarily with three slots 102a1-y-1, 102a1-y-2, 102a1-y-3, each of which is configured to house a disk cartridge such as disk cartridge 120, through disk cartridge bay 102a4-y. A media transport robot 200 (FIGS. 2A-2B) is configured to travel along the horizontal and vertical guide rails 110h, 110v to traverse the rack 102a, as described in more detail elsewhere herein. According to an embodiment, each horizontal guide rail 110h and vertical guide rail 110v comprises a mechanical portion 112 and an electrical portion 113, the significance of which is described in more detail elsewhere herein.

DISK CARTRIDGE HANDLING IN A DATA STORAGE LIBRARY

A data storage library employing disk cartridges (also, "disk cartridge library") may be configured and operated such that magnetic disk media and media drive interior/internal environments are maintained "clean" (e.g., contaminant-controlled), while modular rack components are "dirty" (e.g., less-contaminant-controlled, including uncontrolled). With various approaches to a disk cartridge library, magnetic disk media (e.g., "hard disks") that are typically in conventional hard disk drives are housed in disk cartridges organized in a library. Under the use of robotic automation, cartridges are retrieved and disk media are extracted from the cartridges for access by media drives for reading and writing operations. After access, media are returned to cartridges, which are returned to the library for storage.

Figure 2A:
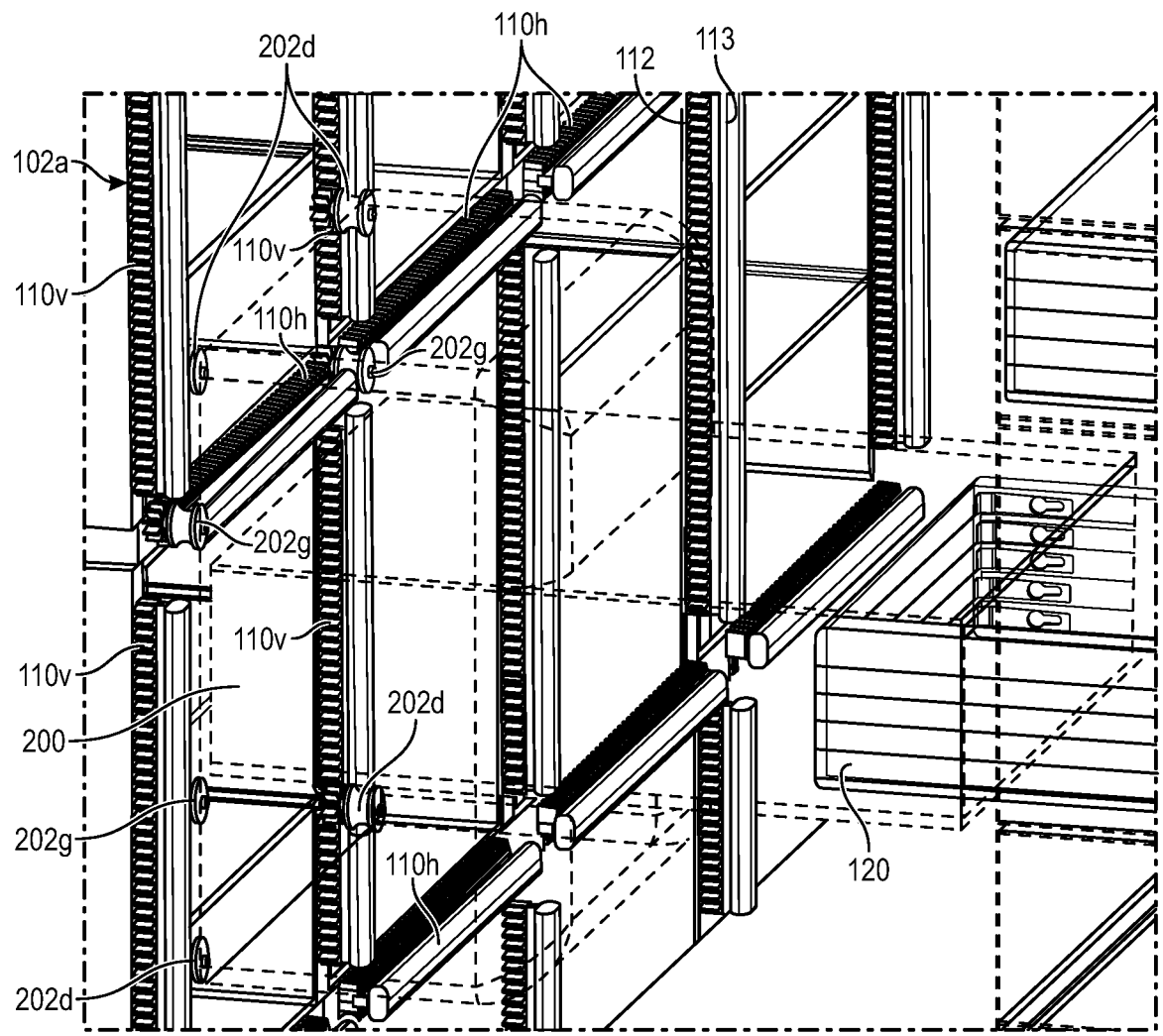
FIG. 2A is a perspective view illustrating a media robot for a disk cartridge library, according to an embodiment.
Figure 2B:
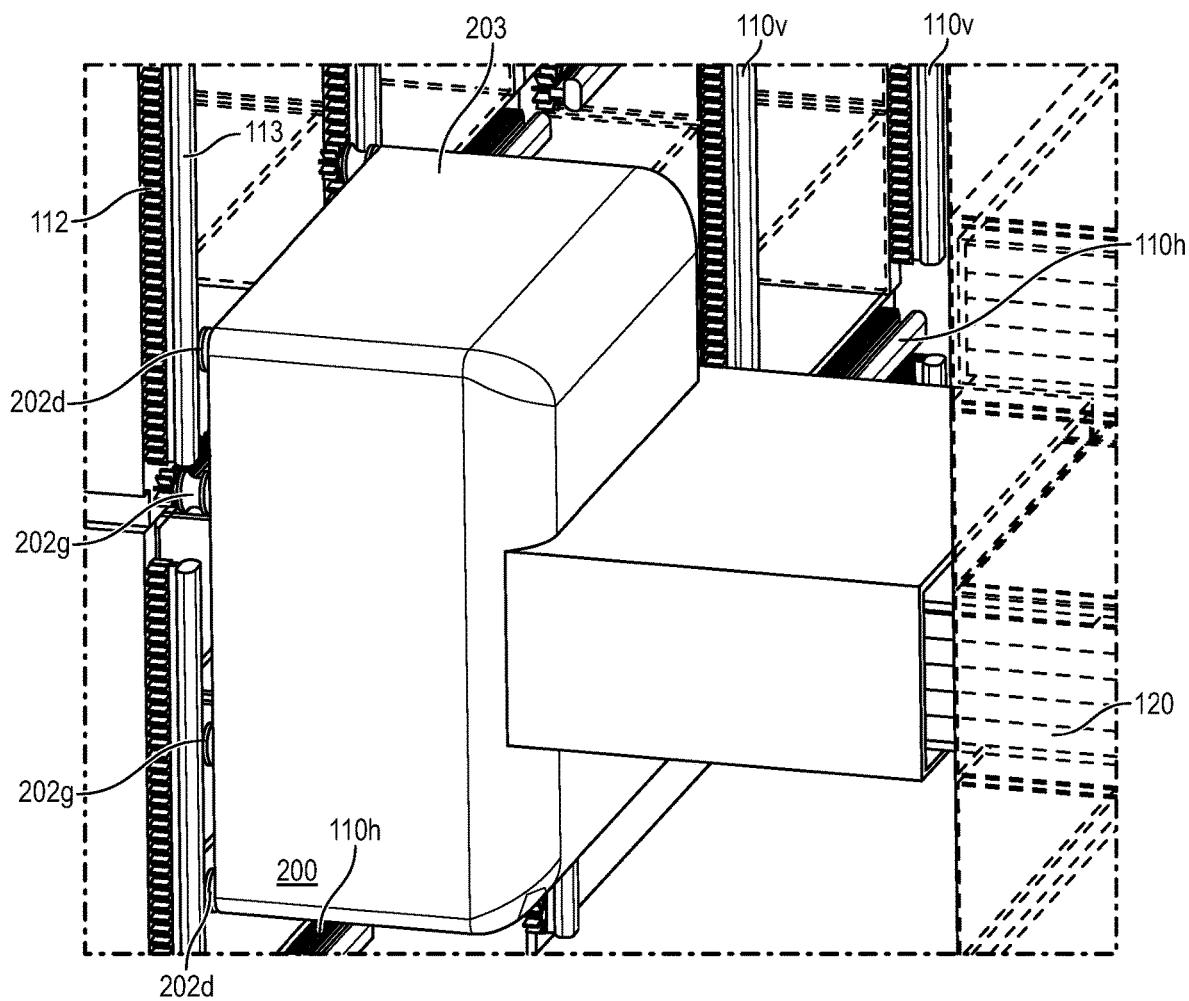
FIG. 2B is a perspective view illustrating the media robot of FIG. 2A, according to an embodiment.

FIG. 2A is a perspective view illustrating a media robot for a disk cartridge library, and FIG. 2B is a perspective view illustrating the media robot of FIG. 2A, both according to an embodiment. Implementation and use of a rack system 100 (FIGS. 1A-1B) for a disk cartridge data storage library is at least in part enabled by the implementation and use of robotic machine 200 ("media transport robot 200") for retrieving a disk cartridge 120 from a cartridge bay 102a1-1, 102a1-2 through 102a1-m (FIG. 1A) and loading the disk cartridge 120 into a media drive or other form of disk cartridge bay, or internally extracting disk media from the disk cartridge 120 and loading the disk media directly into a media drive. Reference is again made to U.S. patent application Ser. No. 18/095,483 for approaches at least to a media drive which may comprise a disk cartridge bay. FIG. 2A depicts media transport robot 200 largely in phantom to better show the interface of the media transport robot 200 with the underlying rack 102a and corresponding horizontal guide rails 110h and vertical guide rails 110v, only some of which are labeled here to maintain clarity. FIG. 2B depicts the media transport robot 200 with its chassis 203 rendered.

According to an embodiment, media transport robot 200 comprises a fixed-position drive wheel 202d ("drive wheel 202d") at each of a plurality of corners of a chassis 203 of the media transport robot 200, where the drive wheels 202d are configured for driving (e.g., being driven by a motor under the control of a controller) the media transport robot 200 along the horizontal and the vertical guide rails 110h, 110v. While each drive wheel 202d is fixed at or near a corresponding corner position of the media transport robot 200, i.e., "fixed-position" drive wheel, these drive wheels 202d are configured for and intended to travel along the horizontal and the vertical guide rails 110h, 110v to traverse the rack 102a, thereby enabling the moving of media between cartridge bays such as cartridge bays 102a1-1 through 102a1-m and media drives of rack 102a-102c. Media transport robot 200 further comprises a pivoting guide wheel 202g corresponding to each drive wheel 202d, where the guide wheels 202g are configured for guiding the corresponding drive wheel 202d horizontally along each horizontal guide rail 110h and vertically along each vertical guide rail 110v.

Figure 3:
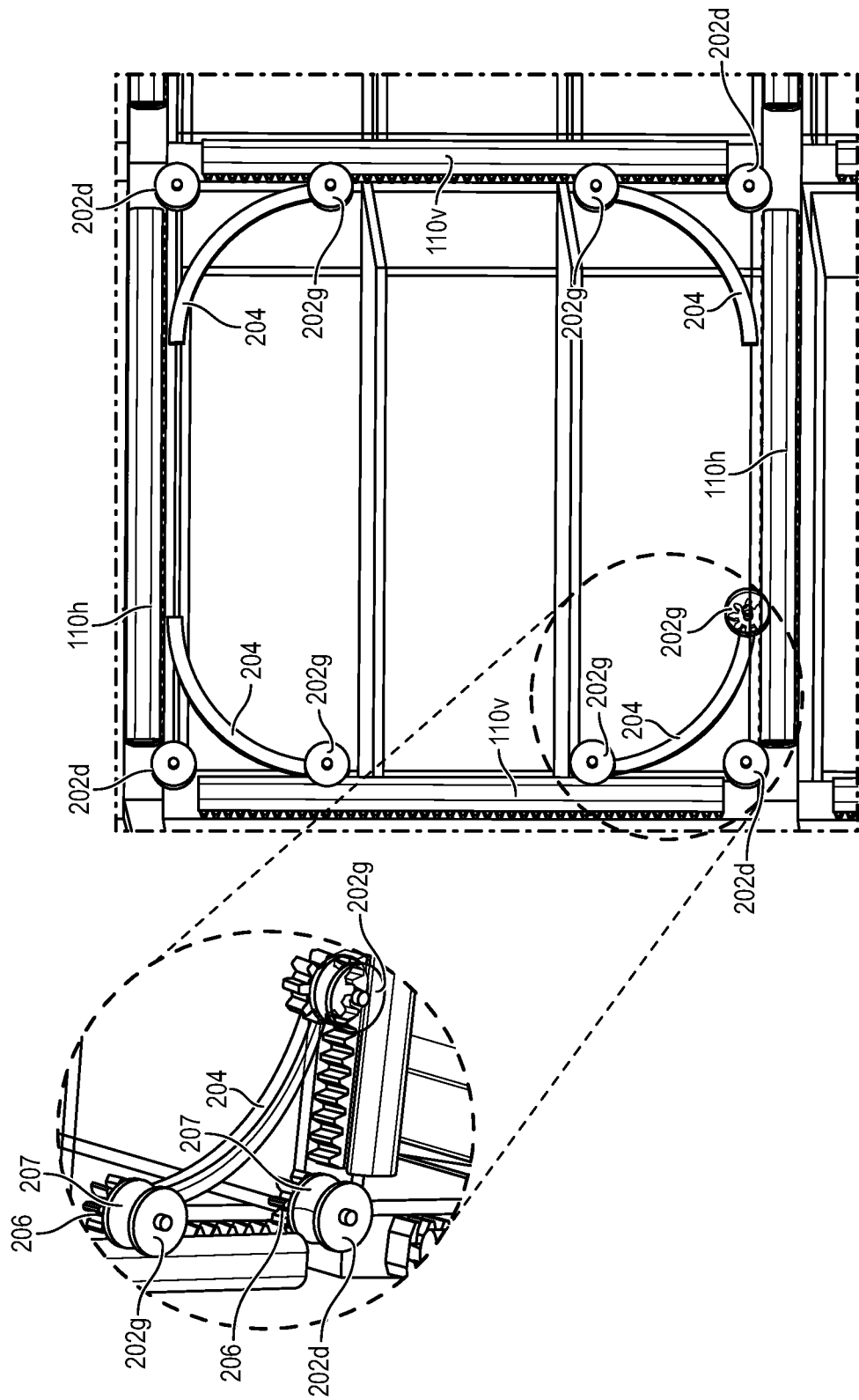
FIG. 3 is a front view illustrating a media robot locomotion system, according to an embodiment.

FIG. 3 is a front view illustrating a media robot locomotion system, according to an embodiment. FIG. 3 depicts the various drive wheels 202d and guide wheels 202g of media transport robot 200 (FIGS. 2A-2B), with the robot not shown here to maintain clarity. According to an embodiment, each guide wheel 202g is configured to travel, move, pivot along a respective track 204 between horizontal guide rails 110h and vertical guide rails 110v. Hence, when the guide wheels 202g are positioned as two on a top horizontal guide rail 110h and two on a bottom horizontal guide rail 110h, the media transport robot 200 is enabled for moving left and right, i.e., horizontally between bays of rack 102a (FIGS. 1A-1B). Similarly, when the guide wheels 202g are positioned as two on a left vertical guide rail 110v and two on a right vertical guide rail 110v, the media transport robot 200 is enabled for moving up and down, i.e., vertically between bays of rack 102a. According to an embodiment, each of the guide wheels 202g is controlled (e.g., via a library system electronic controller) to move along its respective track 204 in series with the other guide wheels 202g. Because each guide wheel 202g repositions one at a time, on-rail stability and electrical connectivity is maintained.

According to an embodiment, each drive wheel 202d and guide wheel 202g comprises a gear portion 206 and an electrically-conductive portion 207, the significance of which is described in more detail elsewhere herein. Hence, the gear portion 206 of drive wheels 202d and guide wheels 202g are configured to mate, interface, mechanically interact with the mechanical portion 112 (FIGS. 1B, 2A) of each horizontal guide rail 110h and vertical guide rail 110v. That is, the gear portion 206 rotatably moves along a stationary linear mechanical portion 112, i.e., each powered by a motor such as a stepper motor for a non-limiting example, with teeth of the gear portion 206 of the drive and guide wheels 202d, 202g mechanically interacting with teeth of the mechanical portion 112 of the horizontal and vertical guide rails 110h, 110v. Similarly, the electrically-conductive portion 207 of drive wheels 202d and guide wheels 202g are configured to mechanically and electrically couple and interact with the electrical portion 113 (FIGS. 1B, 2A) of each horizontal guide rail 110h and vertical guide rail 110v. As such and according to an embodiment, the horizontal and vertical guide rails 110h, 110v provide electrical power and communications signals to one or more (e.g., concurrently) media transport robots 200, via the electrically-conductive portion 207 of drive and guide wheels 202d, wheels 202g and the electrical portion 113 of the horizontal and vertical guide rails 110h, 110v, which enables robot redundancy, scalable performance, and serviceability for such a disk cartridge library.

Figure 4A:
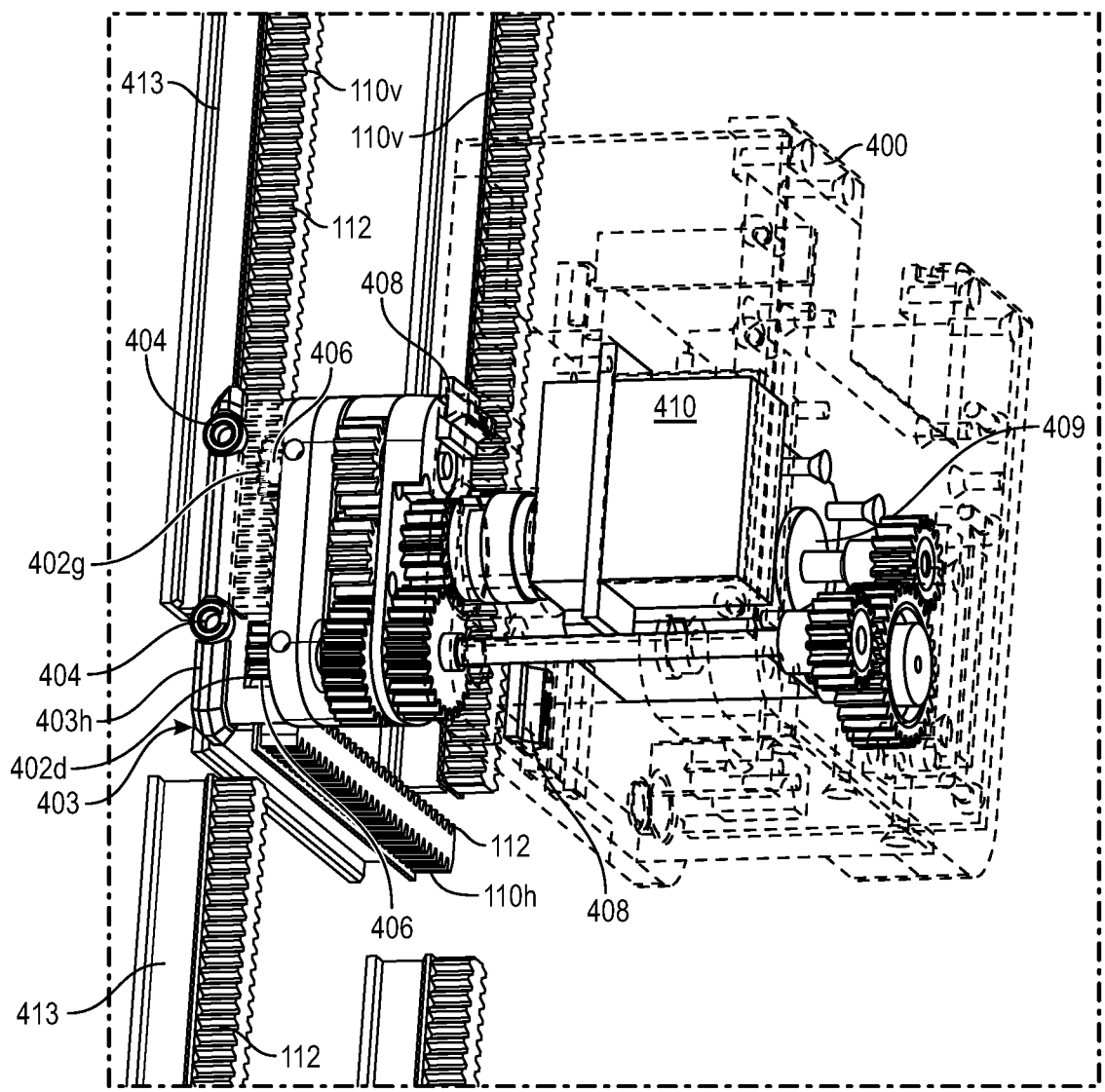
FIG. 4A is a perspective view illustrating a media robot locomotion system, according to an embodiment.
Figure 4B:
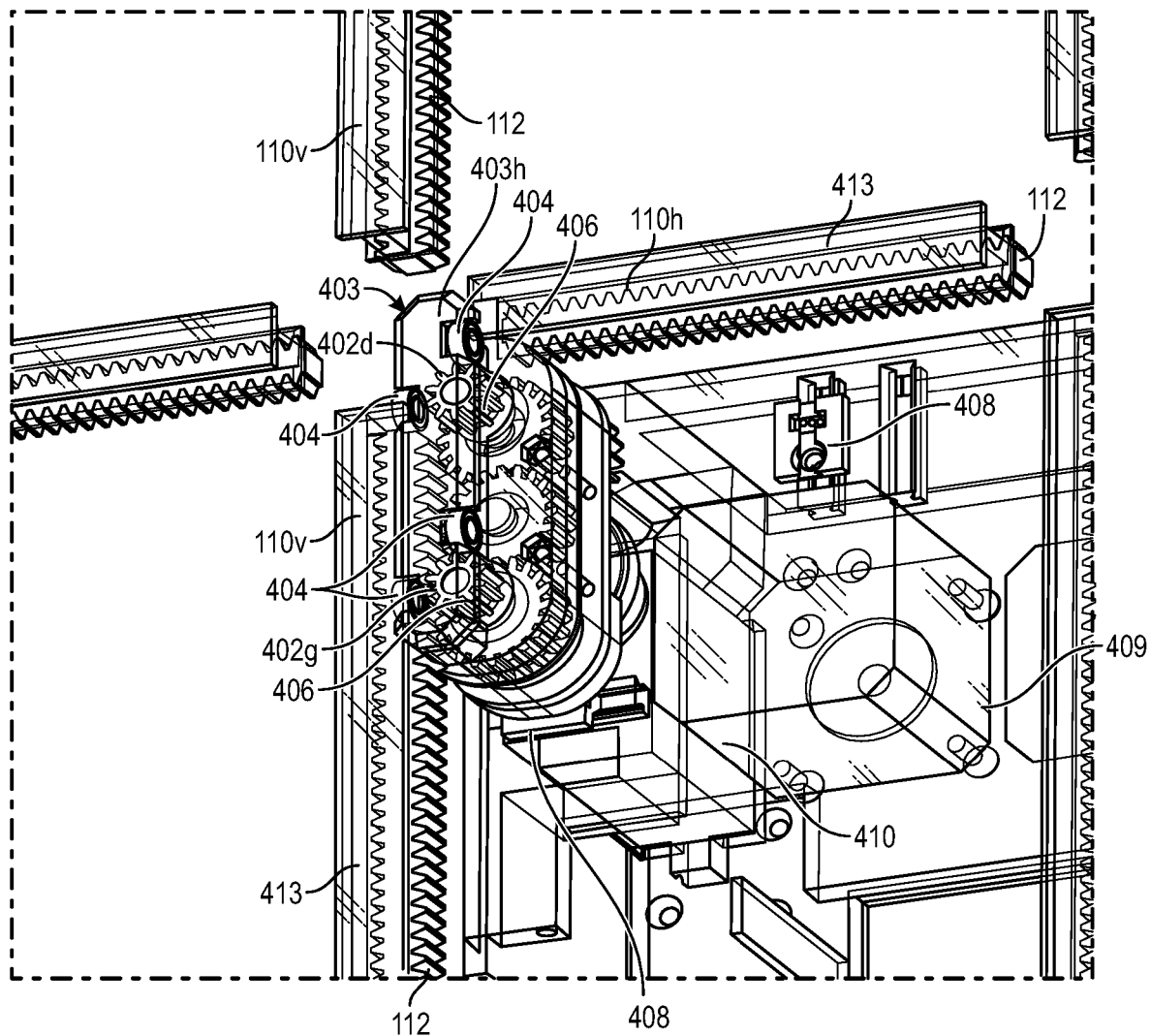
FIG. 4B is another perspective view illustrating the media robot locomotion system of FIG. 4A, according to an embodiment.

FIG. 4A is a perspective view illustrating a media robot locomotion system, and FIG. 4B is another perspective view illustrating the media robot locomotion system of FIG. 4A, according to an embodiment. FIGS. 4A-4B depict a drive wheel 402d and a corresponding guide wheels 402g of a media transport robot 400 (some of which is shown here in phantom to maintain clarity). Except for the manner in which the guide wheels 402g pivot, media transport robot 400 operates similar to how media transport robot 200 operates, such as traversing a disk cartridge library rack 102a (FIGS. 1A-1B) as described in reference to FIGS. 2-3.

For example and according to an embodiment, here also each guide wheel 402g is configured to travel, move, pivot between horizontal guide rails 110h and vertical guide rails 110v. However, no track 204 (FIG. 3) is present in this embodiment. According to an embodiment, each drive wheel 402d and corresponding guide wheel 402g is housed together in a corresponding foot 403, whereby each foot 403 is configured to pivot, rotate between horizontal guide rails 110h and vertical guide rails 110v to align therewith, i.e., the guide wheel 402g pivots about the fixed-position drive wheel 402d, under the control of a servomechanism 409. Hence, when each foot 403 and corresponding guide wheel 402g is positioned as two on a top horizontal guide rail 110h and two on a bottom horizontal guide rail 110h, the media transport robot 400 is enabled to move left and right, i.e., horizontally between bays of rack 102a. Similarly, when each foot 403 and corresponding guide wheel 402g is positioned as two on a left vertical guide rail 110v and two on a right vertical guide rail 110v, the media transport robot 400 is enabled for moving up and down, i.e., vertically between bays of rack 102a. According to an embodiment, here too each of the feet 403 and corresponding pivoting guide wheel 402g is controlled (e.g., via a library system electronic controller) to pivot in series with the other feet 403 so that on-rail stability and electrical connectivity is maintained. With each foot 403 provisioned with a dual-wheel 402d/402g configuration, each foot 403 is enabled to cross gaps in the guide rails 110h, 110v between adjacent bays with the feet remaining in their vertical or horizontal orientations.

According to an embodiment, each foot 403 further comprises a heel portion 403h comprising rollers 404, whereby the horizontal and vertical guide rails 110h, 110v comprise a track portion 413 configured to accept the rollers 404 for securing the heel 403h to the guide rails 110h, 110v. Similar to drive wheels 202d and guide wheels 202g (FIGS. 2-3), drive wheels 402d and guide wheels 402g comprise a gear portion 406. Hence, the gear portion 406 of drive wheels 402d and guide wheels 402g are configured to mate, interface, mechanically interact with the mechanical (drive) portion 112 (FIGS. 1B, 2A) of each horizontal guide rail 110h and vertical guide rail 110v. That is, the gear portion 406 rotatably moves along a stationary linear mechanical portion 112, i.e., each powered by a motor 410 such as a stepper motor for a non-limiting example, with teeth of the gear portion 406 of the drive and guide wheels 402d, 402g mechanically interacting with teeth of the mechanical portion 112 of the horizontal and vertical guide rails 110h, 110v. According to an embodiment, media transport robot 400 further comprises a set of sensors 408 configured to verify contact between a foot 403 and a horizontal and/or vertical guide rail 110h, 110v.

METHOD OF MOVING A MEDIA TRANSPORT ROBOT ALONG A RACK

Figure 5:
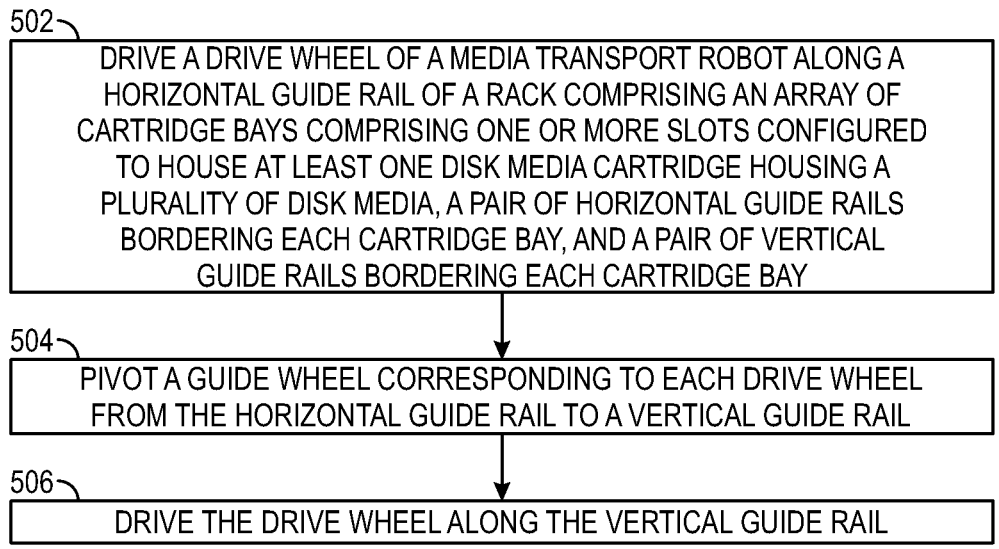
FIG. 5 is a flow diagram illustrating a method of moving a media transport robot along a rack, according to an embodiment.

FIG. 5 is a flow diagram illustrating a method of moving a media transport robot along a rack, according to an embodiment. According to an embodiment, the rack comprises an array of cartridge bays each comprising one or more slots configured to house at least one disk media cartridge housing a plurality of disk media, a pair of horizontal guide rails bordering each cartridge bay, and a pair of vertical guide rails bordering each cartridge bay. The described method may however apply similarly to an array of mixed bays, e.g., some housing disk media cartridges and some housing media drives. In either case, horizontal and vertical guide rails are present to facilitate the movement of one or more media transport robots. The method of FIG. 5 characterizes a manner in which a media transport robot such as media transport robot 200 (FIGS. 2A-2B), 400 (FIGS. 4A-4B) is configured and enabled to traverse a disk cartridge library rack such as rack 102a, 102b, 102c (FIG. 1A).

At block 502, drive a drive wheel of the media transport robot along a horizontal guide rail. For example, one or more drive wheel 202d (FIGS. 2A-3), 402d (FIGS. 4A-4B) is driven, for example and according to an embodiment by a drive motor 410 (FIGS. 4A-4B) such as a stepper motor under the control of an electronic controller, along a horizontal guide rail 110h (FIGS. 1B-3) of a rack 102a (FIGS. 1A-1B, 2A). Furthering the example and according to an embodiment, the drive wheel 202d, 402d drive motor 410 receives a control command via an electrically-conductive portion 113 (FIGS. 2A-2B) of the horizontal guide rail 110h, and the gear portion 206 (FIG. 3) of the drive wheel 202d, 402d which is mechanically interfaced with a drive portion 112 (FIGS. 2A-2B) of the horizontal guide rail 110h is motor-driven accordingly.

At block 504, pivot a guide wheel corresponding to each drive wheel from the horizontal guide rail to a vertical guide rail. For example, once the robot 200, 400 is aligned with a track junction, one or more guide wheel 202g (FIGS. 2A-3), 402g (FIGS. 4A-4B) is pivoted, for example and according to an embodiment in series by a servomechanism 409 (FIGS. 4A-4B) under the control of the electronic controller, from the horizontal guide rail 110h to a vertical guide rail 110v (FIGS. 1B-3) of the rack 102a.

At block 506, drive the drive wheel along the vertical guide rail. For example, one or more drive wheel 202d, 402d is driven, for example and according to an embodiment by a stepper motor 410 under the control of an electronic controller, along the vertical guide rail 110v. Furthering the example and according to an embodiment, after pivoting the guide wheel 202g, 402g and prior to driving the drive wheel 202d, 402d along the vertical guide rail 110v, verify positioning and contact between the guide wheel 202g, 402g and the vertical guide rail 110v, e.g., via one or more Hall effect sensors 408 (FIG. 4) according to an embodiment, and then pivot a second guide wheel 202g, 402g from a second horizontal guide rail 110v of the cartridge bay to a second vertical guide rail 110v of the cartridge bay, thereby pivoting or repositioning the guide wheels 202g, 402g in series so that on-rail stability as well as electrical connectivity is maintained via the respective mechanical and electrical portions of the guide wheel/guide rail interfaces.

According to an embodiment, media transport robot 200 (FIGS. 2A-2B), 400 (FIGS. 4A-4B) further comprises computer vision functionality, such as a camera mechanism mounted on robot 200, 400. Computer vision can provide direct visual alignment with a slot (see, e.g., slot 102a1-6-s of FIG. 1A; slots 102a1-x-1 through 102a1-x-3 of FIG. 1B) to compensate for mechanical variations in position that may be caused by robot 200, 400 material flexure, build tolerances in both the robot 200, 400 and the rack 102a, variations due to wear, etc. Additionally, visual identification of a given disk cartridge (see, e.g., disk cartridge 120 of FIGS. 1A-1B) allows for presence detection (e.g., the rack 102a is not sealed and contents may be added or removed by an operator), inventory checking, cartridge ID scanning and verification, etc. Still further, visual functionality enables detection of jamming or skipped motor steps that would otherwise cause the robot 200, 400 to lose position accuracy.

Processing, functions, procedures, actions, method steps, and the like, that are described herein as being performed or performable by an electronic controller may include a data cartridge library system controller embodied in any form of and/or combination of software, hardware, and firmware. An electronic controller in this context typically includes circuitry such as one or more processors for executing instructions, and may be implemented as a System On a Chip (SoC) electronic circuitry, which may include a memory, a microcontroller, a Digital Signal Processor (DSP), an ASIC, a Field Programmable Gate Array (FPGA), hard-wired logic, analog circuitry and/or a combination thereof, for non-limiting examples. Firmware, i.e., executable logic which may be stored in controller memory, includes machine-executable instructions for execution by the controller in operating components such as drive wheels 202*d* and guide wheels 202*g*.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage system comprising:
a rack comprising:
an array comprising a plurality of bays, each of the plurality of bays comprising one or more slots each configured to house at least one disk media cartridge or media drive,
a pair of horizontal guide rails bordering each of the plurality of bays,
a pair of vertical guide rails bordering each of the plurality of bays; and
a media transport robot comprising:
a fixed-position drive wheel at each of a plurality of corners of a chassis of the media transport robot, the drive wheels configured for driving the media transport robot along the horizontal and the vertical guide rails, and
a pivoting guide wheel corresponding to each drive wheel, the guide wheels configured for guiding the corresponding drive wheel horizontally along a horizontal guide rail and vertically along a vertical guide rail.

2. The data storage system of claim 1, wherein each guide wheel is configured to move along a respective track between horizontal and vertical guide rails.

3. The data storage system of claim 2, wherein:
with each guide wheel coupled with a horizontal guide rail, the media transport robot is configured to travel horizontally on the rack; and
with each guide wheel coupled with a vertical guide rail, the media transport robot is configured to travel vertically on the rack.

4. The data storage system of claim 2, wherein each of the plurality of guide wheels is controlled to move along its respective track in series with the other guide wheels.

5. The data storage system of claim 1, wherein the drive wheels and the guide wheels each comprises a gear portion and an electrically-conductive portion.

6. The data storage system of claim 1, wherein the horizontal guide rails and the vertical guide rails each comprises an electrical portion and a mechanical portion.

7. The data storage system of claim 6, wherein the drive wheels and the guide wheels each comprises:
a gear portion having teeth configured to mechanically interface with the mechanical portion of each horizontal and vertical guide rail; and
an electrically-conductive portion configured to mechanically and electrically couple with the electrical portion of each horizontal and vertical guide rail.

8. The data storage system of claim 6, wherein the electrical portion of each horizontal guide rail and vertical guide rail is configured to supply electrical power and communications signals to the media transport robot.

9. The data storage system of claim 1, wherein the rack is configured to concurrently supply electrical power and communications signals to multiple media transport robots via the horizontal and vertical guide rails.

10. The data storage system of claim 1, wherein at least one of the bays of the rack houses one or more disk cartridges, the data storage system further comprising:
a second rack comprising one or more media drive bays;
wherein the media transport robot is positioned between the rack and the second rack and configured to transport disk cartridges between cartridge bays of the rack and media drive bays of the second rack.

11. The data storage system of claim 1, wherein:
each guide wheel and corresponding drive wheel are housed together in a corresponding foot; and
each foot is configured to pivot the corresponding guide wheel between horizontal and vertical guide rails.

12. The data storage system of claim 11, wherein:
with each foot coupled with a horizontal guide rail, the media transport robot is configured to travel horizontally on the rack; and
with each foot coupled with a vertical guide rail, the media transport robot is configured to travel vertically on the rack.

13. The data storage system of claim 11, wherein each foot is controlled to pivot in series with the other feet.

14. The data storage system of claim 11, wherein the media transport robot further comprises a set of sensors configured to verify contact between a foot and a corresponding horizontal or vertical guide rail.

15. The data storage system of claim 11, wherein:
each foot comprises a heel portion comprising rollers;

the drive wheels and the guide wheels each comprises a gear portion; and the horizontal guide rails and the vertical guide rails each comprises a drive portion configured to accept each gear portion of the drive wheels and the guide wheels and a track portion configured to accept the rollers for securing the heel portion to the horizontal and vertical guide rails.

16. The data storage system of claim 11, wherein each drive wheel is configured to be driven by a stepper motor.

17. A method for moving a media transport robot along a rack comprising an array comprising a plurality of cartridge bays each comprising one or more slots configured to house at least one disk media cartridge housing a plurality of disk media, a pair of horizontal guide rails bordering each cartridge bay, and a pair of vertical guide rails bordering each cartridge bay, the method comprising:

driving a drive wheel of the media transport robot along a horizontal guide rail;

pivoting a guide wheel corresponding to each drive wheel from the horizontal guide rail to a vertical guide rail; and driving the drive wheel along the vertical guide rail.

18. The method of claim 17, wherein driving the drive wheel along the horizontal guide rail includes:

receiving a control command via an electrically-conductive portion of the horizontal guide rail; and driving a gear portion of the drive wheel mechanically interfaced with a drive portion of the horizontal guide rail.

19. The method of claim 17, the method further comprising:

after pivoting the guide wheel and prior to driving the drive wheel along the vertical guide rail, verifying contact between the guide wheel and the vertical guide rail; and pivoting a second guide wheel from a second horizontal guide rail of the cartridge bay to a second vertical guide rail of the cartridge bay.

* * * * *